US008289909B2

(12) United States Patent
Belling

(10) Patent No.: US 8,289,909 B2
(45) Date of Patent: Oct. 16, 2012

(54) SUPPORT OF MEDIA ORIENTED NEGOTIATION ACCELERATION PROCEDURES IN SPLIT ARCHITECTURE

(75) Inventor: Thomas Belling, Erding (DE)

(73) Assignee: Nokia Siemens Networks Oy, Espoo (FI)

( * ) Notice: Subject to any disclaimer, the term of this patent is extended or adjusted under 35 U.S.C. 154(b) by 999 days.

(21) Appl. No.: 12/188,834

(22) Filed: Aug. 8, 2008

(65) Prior Publication Data

US 2009/0046643 A1    Feb. 19, 2009

(30) Foreign Application Priority Data

Aug. 13, 2007    (EP) .................................. 07114269

(51) Int. Cl.
*H04W 4/00*    (2009.01)
(52) U.S. Cl. ........ 370/329; 370/352; 370/401; 370/328; 370/437
(58) Field of Classification Search .................. 370/329, 370/352, 401, 328, 356, 338, 437
See application file for complete search history.

(56) References Cited

U.S. PATENT DOCUMENTS

| 7,680,143 | B2 * | 3/2010 | Jabri et al. ..................... 370/437 |
| 2005/0091392 | A1 * | 4/2005 | Gesswein et al. ............. 709/231 |
| 2007/0129052 | A1 * | 6/2007 | Jabri et al. ..................... 455/403 |
| 2007/0297339 | A1 * | 12/2007 | Taylor et al. .................. 370/248 |
| 2010/0118778 | A1 * | 5/2010 | Ranke et al. .................. 370/328 |
| 2010/0134590 | A1 * | 6/2010 | Lindstrom et al. ......... 348/14.11 |

OTHER PUBLICATIONS

"3GPP TR 29.863 V7.2.0 (Jun. 2007): 3rd Generation Partnership Project; Technical Specification Group Core Network and Terminals; Feasibility Study for the Multimedia Inter-Working Between the IP Multimedia Core Network (CN) Subsystem (IMS) and Circuit Switched (CS) Networks (Release 7)," 3GPP Organizational Partners, 2007, 58 pages.
"3GPP TS 29.163 V7.6.0 (Mar. 2007): 3rd Generation Partnership Project; Technical Specification Group Core Network and Terminals; Interworking Between the IP Multimedia (IM) Core Network (CN) Subsystem and Circuit Switched (CS) Networks (Release 7)," 3GPP Organizational Partners, 2006, 161 pages.
"3GPP TS 29.332 V7.7.0 (Jun. 2007): 3rd Generation Partnership Project; Technical Specification Group Core Network and Terminals; Media Gateway Control Function (MGCF)—IM Media Gateway; MN Interface (Release 7)," 3GPP Organizational Partners, 2007, 72 pages.
"3GPP TSG-CT WG3 Meeting #45 V7.2.0: Change Request; MONA Mn Procedures," 3GPP Organizational Partners, Aug. 20-24, 2007, Vienna, 10 pages.

(Continued)

*Primary Examiner* — Ricky Ngo
*Assistant Examiner* — Rasheed Gidado
(74) *Attorney, Agent, or Firm* — Squire Sanders (US) LLP

(57) ABSTRACT

An apparatus is configured to send a message to a controller requesting that a media oriented negotiation acceleration preference message is to be sent repeatedly. The apparatus is further configured to provide the controller with media oriented negotiation acceleration preferences within that message which are to be advertised by the controller, and to request the controller to send a notification to the apparatus about receipt of the first media oriented negotiation acceleration preference message. The apparatus receives a notification from the controller about receipt of a media oriented negotiation acceleration preference message which firstly came in at the controller.

30 Claims, 8 Drawing Sheets

OTHER PUBLICATIONS

"ITU-T H.223 (Jul. 2001): Series H: Audiovisual and Multimedia Systems; Infrastructure of Audiovisual Services—Transmission Multiplexing and Synchronization; Multiplexing Protocol for Low Bit Rate Multimedia Communication," International Telecommunication Union, 2002, 74 pages.

"ITU-T H.245 (May 2006): Series H: Audiovisual and Multimedia Systems; Infrastructure of Audiovisual Services—Communication Procedures; Control Protocol for Multimedia Communication," International Telecommunication Union, 2006, 342 pages.

"ITU-T H.248.12 (Jul. 2001): Series H: Audiovisual and Multimedia Systems; Infrastructure of Audiovisual Services—Communication Procedures; Gateway Control Protocol: H.248.1 Packages for H.323 and H.324 Interworking," International Telecommunication Union, 2002, 30 pages.

"ITU-T H.263 (Jan. 2005): Series H: Audiovisual and Multimedia Systems; Infrastructure of Audiovisual Services—Coding of Moving Video; Video Coding for Low Bit Rate Communication," International Telecommunication Union, 2005, 226 pages.

"ITU-T H.264 (Mar. 2005): Series H: Audiovisual and Multimedia Systems; Infrastructure of Audiovisual Services—Coding of Moving Video; Advanced Video Coding for Generic Audiovisual Services," International Telecommunication Union, 2005, 343 pages.

"ITU-T H.323 (Jun. 2006): Series H: Audiovisual and Multimedia Systems; Infrastructure of Audiovisual Services—Systems and Terminal Equipment for Audiovisual Services; Packet-Based Multimedia Communications Systems," International Telecommunication Union, 2007, 304 pages.

"ITU-T H.324 Amendment 1 (Aug. 2006): Series H: Audiovisual and Multimedia Systems; Infrastructure of Audiovisual Services—Systems and Terminal Equipment for Audiovisual Services; Annex K 'Media Oriented Negotiation Acceleration Procedure' and Associated Changes to Annex J," International Telecommunication Union, 2006, 28 pages.

"ITU-T H.324 Amendment 1 (Aug. 2006): Series H: Audiovisual and Multimedia Systems; Infrastructure of Audiovisual Services—Systems and Terminal Equipment for Audiovisual Services; Terminal for Low Bit-Rate Multimedia Communication; Amendment 1: New Annex K 'Media Oriented Negotiation Acceleration Procedure' and Associated Changes to Annex J," International Telecommunication Union, 2007, 34 pages.

Rosenberg et al., "SIP: Session Initiation Protocol," [online] [retrieved Sep. 2, 2010]. Retrieved from the Internet: <http://www.ietf.org/rfc/rfc3261.txt>. 236 pages.

European Search Report from corresponding European Patent Appl. No. 07114269.9, dated Feb. 14, 2008.

International Search Report from related International Appl. No. PCT/EP2008/059599, mailed Jan. 30, 2009.

Written Opinion from related International Appl. No. PCT/EP2008/059599, mailed Jan. 30, 2009.

* cited by examiner

CS-Domain                                                              IMS

Termination:
T1 CS-Domain (CS-Bearer (BS30) for H.245 control, Speech, Video)
T2 Multiplexing (H.245 control, Speech, Video)
T3 Video (own RTP-stream)+Speech (own RTP-stream)

Stream:
Stream1 (between T1 and T2) data (H.245 control, speech, Video)
Stream2 (terminated an T2) H.245 Control Information
Stream3 (between T2 and T3) Video
Stream4 (between T2 and T3) Speech

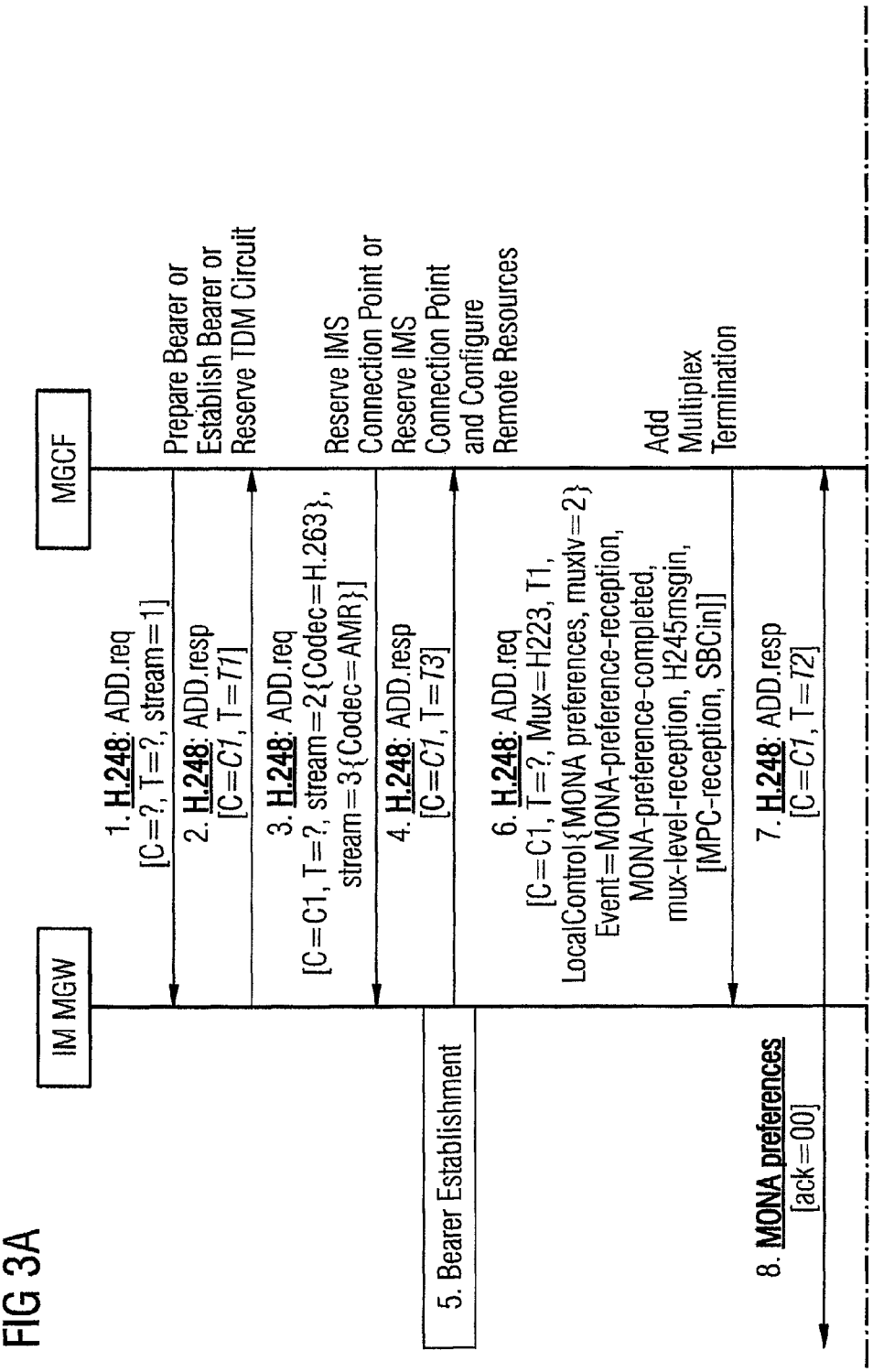

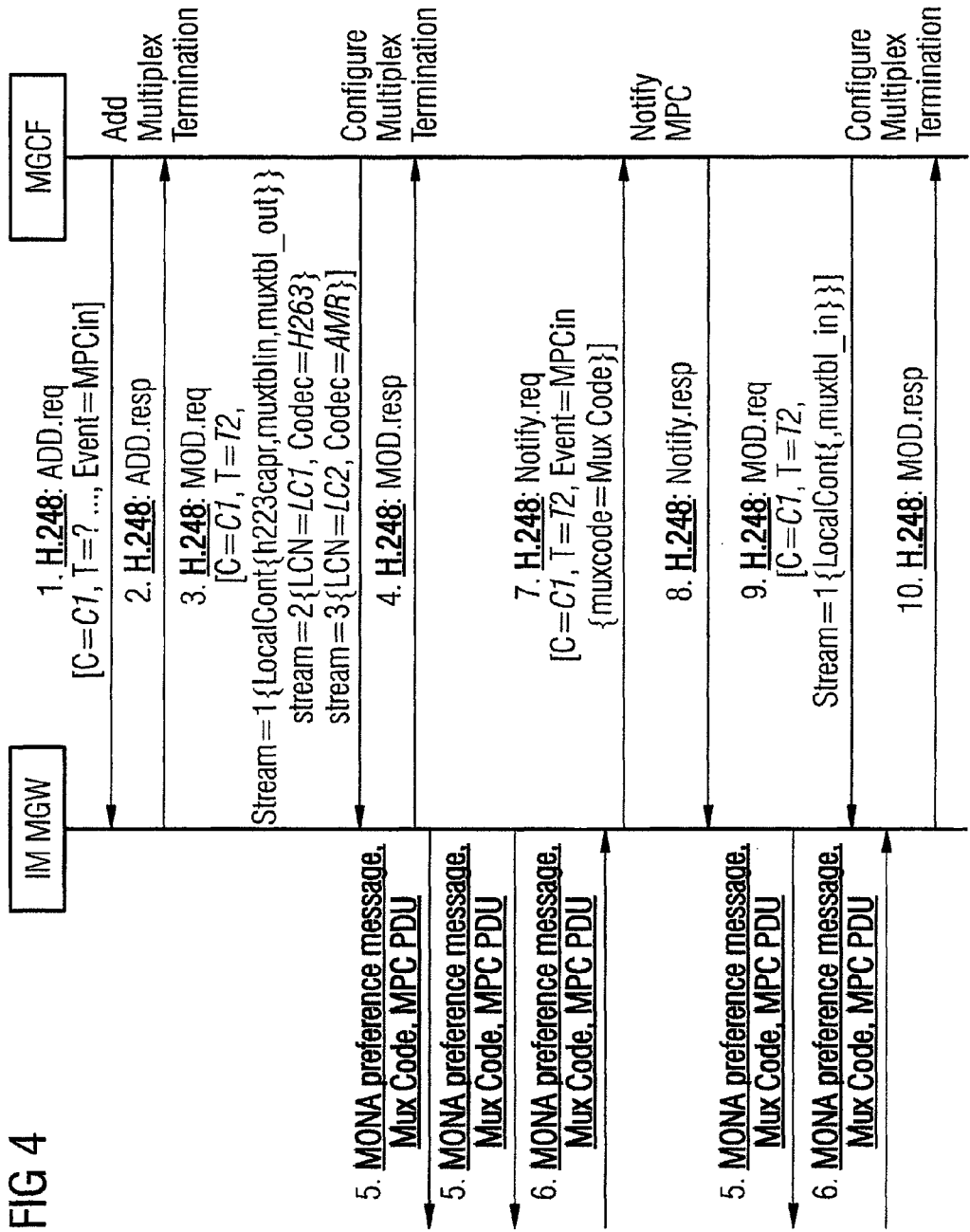

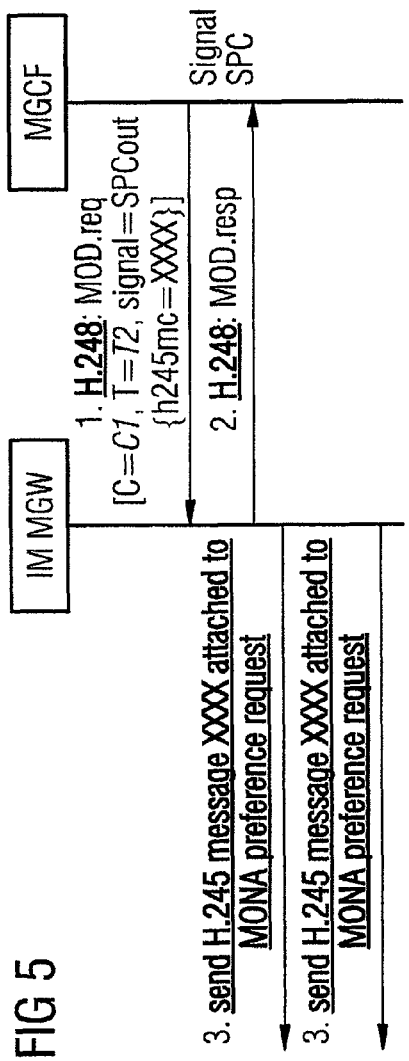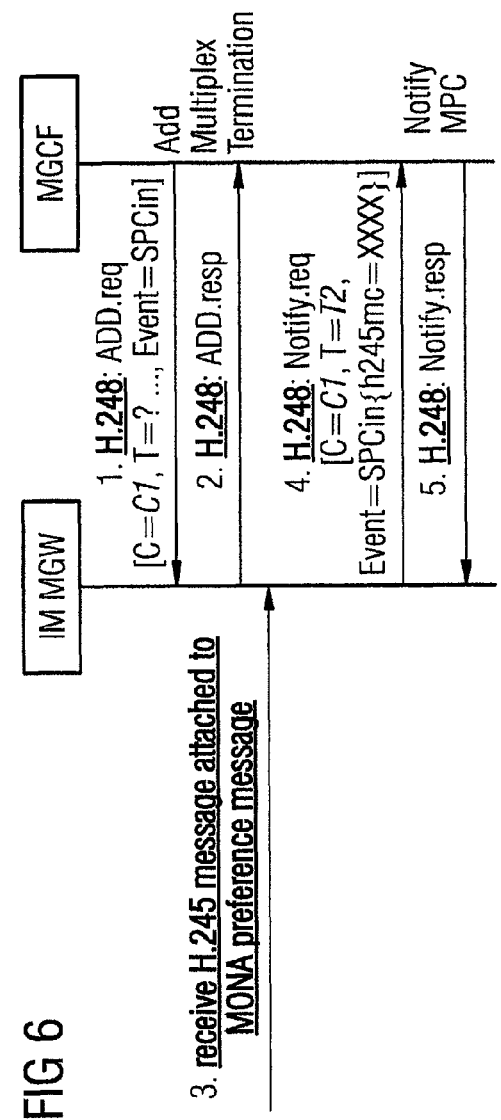

SUPPORT OF MEDIA ORIENTED NEGOTIATION ACCELERATION PROCEDURES IN SPLIT ARCHITECTURE

CROSS-REFERENCE TO RELATED APPLICATION

This application claims the benefit of European priority application EP 07 114 269.9, filed Aug. 13, 2007, which is expressly incorporated by reference herein in its entirety.

FIELD OF THE INVENTION

The present invention relates to interrelated apparatuses both of which are configured to support media oriented negotiation procedures in split architecture. The present invention also relates to corresponding methods and computer program products.

Media Oriented Negotiation Acceleration (MONA), as specified in the specification ITU-T H.324 Amendment 1 of the International Telecommunication Union (ITU), provides simplified procedures that allow for a faster call set-up of a H.324 Multimedia call (e.g. using voice and video) than standard H.324 procedures as specified in specification ITU-T H.324, and also allow for a fallback to standard H.324 procedures if either party does not support the enhanced procedures. H.324 is a protocol suite which combines signalling according to specification ITU-T H.245 and media in user plane bearers.

Multimedia calls may also be performed using the session initiation protocol SIP according to the specification RFC 3261 of the International Engineering Task Force as call control and Internet Protocol (IP)/user datagram protocol (UDP)/real time protocol (RTP) based media transport.

While Multimedia calls in the circuit switched (CS) domain of the $3^{rd}$ generation (according to the $3^{rd}$ generation partnership project 3GPP) use H.324, possibly with the MONA enhancements, multimedia calls in the 3GPP Internet Multimedia Subsystem (IMS) use SIP and IP/UDP/RTP.

For multimedia calls between the 3GPP CS domain and the IMS, an interworking between H.324 and SIP is therefore required. Such an interworking is standardised in the specification 3GPP TS 29.163.

A typical network configuration as outlined above is shown in FIG. 1.

The interworking is performed by entities with a so-called split architecture between call control signalling handling and media handling: The Media Gateway Control Function (MGCF) controls the attached Internet Multimedia Media gateway (IM-MGW) using the ITU-T H.248 protocol over the so-called Mn interface.

Some of the present MONA procedures are summarized in the following.

MONA "preference message" signalling is used instead of H.324 Multiplexing level negotiation. Should standard H.324 Multiplexing level stuffing flags be received, a fallback to standard H.324 procedures is triggered. The sending of MONA preference messages is repeated by each MONA capable H.324 terminal until a reception is acknowledged by the peer.

During this phase, two packet data unit (PDU) types may optionally be attached by MONA terminals to these preference messages. Either, these could be Media Preconfigured Channel (MPC) packet data units. That is, MONA defines a small number of preconfigured H.223 channels for the most widespread audio and video codecs (AMR, AMR-WB, H.264 MPEG4 and H.263). Media packet data units for these codecs may be attached to the MONA "preference message" during the call setup. Or, these could be Signalling Preconfigured Channel (SPC) packet data units. These packet data units are H.245 generic request messages with special parameters defined by MONA. These packet data units may also be attached to MONA preference messages.

According to MONA, each MONA capable terminal shall support at least one of these PDU types.

The MONA preference message exchange in combination with attached MPC or SPC packet data units may result in the establishment of the desired media channels without further H.245 signalling. Otherwise, H.245 will be used after the MONA preference message exchange is acknowledged to negotiate media channels, but MONA defines some accelerated H.245 procedures (ACP) to speed up these H.245 procedures.

H.248 procedures to support the interworking between standard H.324 procedures and SIP in split architecture have already been standardized in the specifications 3GPP TR 29.863, TS 29.163 and TS 29.332 and ITU-T H.248.12, but H.248 procedures to support the interworking between H.324 MONA and SIP in split architecture are still outstanding.

Therefore, it is an object of the present invention to overcome the above described shortcomings of the prior art.

Thus, an implementation of the present invention to the above described scenario can provide suitable procedures for the above described purpose.

In addition, the same procedures can also be applied for an interworking between the ITU-T H.324 protocol suite, which uses H.245 signalling in-band, and the ITU-T H.323 protocol suite, which uses H.245 signalling out-of-band.

According to a first aspect of the present invention, there is provided a gateway controlling device configured to send a message to a controlled device requesting that a media oriented negotiation acceleration preference message is to be sent repeatedly; provide the controlled device with media oriented negotiation acceleration preferences within that message which are to be advertised by the controlled device; request the controlled device to send a notification to the gateway controlling device about receipt of the first media oriented negotiation acceleration preference message; and receive a notification from the controlled device about receipt of a media oriented negotiation acceleration preference message which firstly came in at the controlled device.

Modifications of the first aspect according to the present invention may be follows.

The gateway controlling device may be further configured to have a media gateway control function implemented.

The gateway controlling device may be further configured to send a message to the controlled device requesting to be notified about the channel type of received media preconfigured channel packet data units.

The gateway controlling device may be further configured to send a message to the controlled device requesting to send media encoded according to one or several of media predefined channel types defined by media oriented negotiation acceleration.

The gateway controlling device may be further configured to send a message to the controlled device requesting to be notified about the receipt of signalling preconfigured channel packet data units.

The gateway controlling device may be further configured to send a message to the controlled device providing a signalling preconfigured channel packet data unit and requesting that this packet data unit is forwarded repeatedly.

The gateway controlling device may be further configured to send a message to the controlled device requesting to be notified about the receipt of H.323 multiplex level stuffing flags.

According to a second aspect of the present invention, there is provided a media gateway device configured to receive a message from a gateway controlling device requesting that a media oriented negotiation acceleration preferences negotiation is started and including media oriented negotiation acceleration preferences to be advertised; repeatedly send media oriented negotiation acceleration preference messages; and increment acknowledgment bits of sent media oriented negotiation acceleration preference messages when receiving incoming media oriented negotiation acceleration preference messages.

Modifications of the second aspect according to the present invention may be follows.

The media gateway device may be further configured to have an internet multimedia subsystem media gateway functionality implemented.

The media gateway device may be further configured to notify the gateway controlling device when receiving the first incoming media oriented negotiation acceleration preference message; and forward the received information, wherein the gateway controlling device is not notified about subsequent incoming media oriented negotiation acceleration preference message.

The media gateway device may be further configured to receive a first media preconfigured channel packet data unit of a given predefined channel type; and notify the gateway controlling device about the received channel type.

The media gateway device may be further configured to receive media streams that require interworking towards a corresponding H.324 session; and send these media streams in media preconfigured channel packet data units of a predefined channel type requested by the gateway controlling device by media oriented negotiation acceleration preference messages, transcoding the media if required.

The media gateway device may be further configured to receive a first signalling preconfigured channel packet data unit; and forward the signalling preconfigured channel packet data unit to the gateway controlling device.

The media gateway device may be further configured to compare any subsequently received signalling preconfigured channel packet data units with the previously received signalling preconfigured channel packet data unit; and forward the subsequently received signalling preconfigured channel packet data unit to the gateway controlling device only, if it differs from the previously received signalling preconfigured channel packet data unit.

The media gateway device may be further configured to receive a message from the gateway controlling device providing a signalling preconfigured channel packet data unit; and repeatedly forward this signalling preconfigured channel packet data unit.

The media gateway device may be further configured to notify the gateway controlling device about the receipt of more than a preconfigured number of valid consecutive multiplex level stuffing flags.

According to a third aspect of the present invention, there is provided a controlling method, comprising sending a message from a gateway controlling device to a controlled device requesting that a media oriented negotiation acceleration preference message is sent repeatedly; providing the controlled device by the gateway controlling device with media oriented negotiation acceleration preferences within that message which are to be advertised by the controlled device; requesting the controlled device to be notified about the receipt of the first media oriented negotiation acceleration preference message; and receiving a notification from the controlled device about the receipt of a media oriented negotiation acceleration preference message which firstly came in at the controlled device.

Modifications of the third aspect of the present invention may be as follows.

The controlling method may further comprise using a media gateway control function by the gateway controlling device.

The controlling method may further comprise sending a message by the gateway controlling device to the controlled device requesting to be notified about a channel type of received media preconfigured channel packet data units.

The controlling method may further comprise sending a message by the gateway controlling device to the controlled device requesting to send media encoded according to one or several of media predefined channel types defined by media oriented negotiation acceleration.

The controlling method may further comprise sending a message by the gateway controlling device to the controlled device requesting to be notified about the receipt of signalling preconfigured channel packet data units.

The controlling method may further comprise sending a message by the gateway controlling device to the controlled device providing a signalling preconfigured channel packet data unit and requesting that this packet data unit is forwarded repeatedly.

The controlling method may further comprise sending a message to the controlled device requesting to be notified about the receipt of H.323 multiplex level stuffing flags.

According to a fourth aspect of the present invention, there is provided a media gateway method comprising receiving a message from a gateway controlling device by a media gateway device requesting that a media oriented negotiation acceleration preferences negotiation is started and including media oriented negotiation acceleration preferences to be advertised; repeatedly sending media oriented negotiation acceleration preference messages by the media gateway device; and incrementing acknowledgment bits of sent media oriented negotiation acceleration preference messages by the media gateway device when receiving incoming media oriented negotiation acceleration preference messages.

Modifications of the fourth aspect of the present invention may be as follows.

The media gateway method may further comprise using an internet multimedia subsystem media gateway functionality by the media gateway device.

The media gateway method may further comprise notifying the gateway controlling device by the media gateway device when receiving the first incoming media oriented negotiation acceleration preference message; and forwarding the received information by the media gateway device, wherein the gateway controlling device is not notified about subsequent incoming media oriented negotiation acceleration preference message.

The media gateway method may further comprise receiving a first media preconfigured channel packet data unit of a given predefined channel type by the media gateway device; and notify the gateway controlling device by the media gateway device about the received channel type.

The media gateway method may further comprise receiving media streams by the media gateway device that require interworking towards a corresponding H.324 session; and sending these media streams by the media gateway device in media preconfigured channel packet data units of a predefined channel type requested by the gateway controlling device by media oriented negotiation acceleration preference messages, and transcoding the media by the media gateway device if required.

The media gateway method may further comprise receiving a first signalling preconfigured channel packet data unit by the media gateway device; and forwarding the signalling preconfigured channel packet data unit by the media gateway device to the controlling device.

The media gateway method may further comprise comparing by the media gateway device any subsequently received signalling preconfigured channel packet data units with the previously received signalling preconfigured channel packet data unit; and forwarding the subsequently received signalling preconfigured channel packet data unit by the media gateway device to the gateway controlling device only, if it differs from the previously received signalling preconfigured channel packet data unit.

The media gateway method may further comprise receiving a message by the media gateway device from the gateway controlling device providing a signalling preconfigured channel packet data unit; and repeatedly forwarding this signalling preconfigured channel packet data unit by the media gateway device.

The media gateway method may further comprise notifying the gateway controlling device about the receipt of more than a preconfigured number of valid consecutive multiplex level stuffing flags.

According to a fifth aspect of the present invention, there is provided a computer program product embodied on a computer-readable medium, the computer program product configured to provide instructions to carry out a method according to the third or fourth aspect of the present invention or any of their modifications.

Further aspects, features and advantages of the present invention will become more fully apparent from the following detailed description of the preferred embodiments which is to be taken in conjunction with the appended drawings, in which:

FIG. 4 shows signalling interactions at the Mn interface for MONA media preconfigured channels involving a gateway controlling device (MGCF) and a media gateway device (IM MGW) and thus also illustrates respective configurations of these devices;

FIG. 5 shows signalling interactions at the Mn interface for sending MONA signalling preconfigured channels involving a gateway controlling device (MGCF) and a media gateway device (IM MGW) and thus also illustrates respective configurations of these devices;

Figure 7:
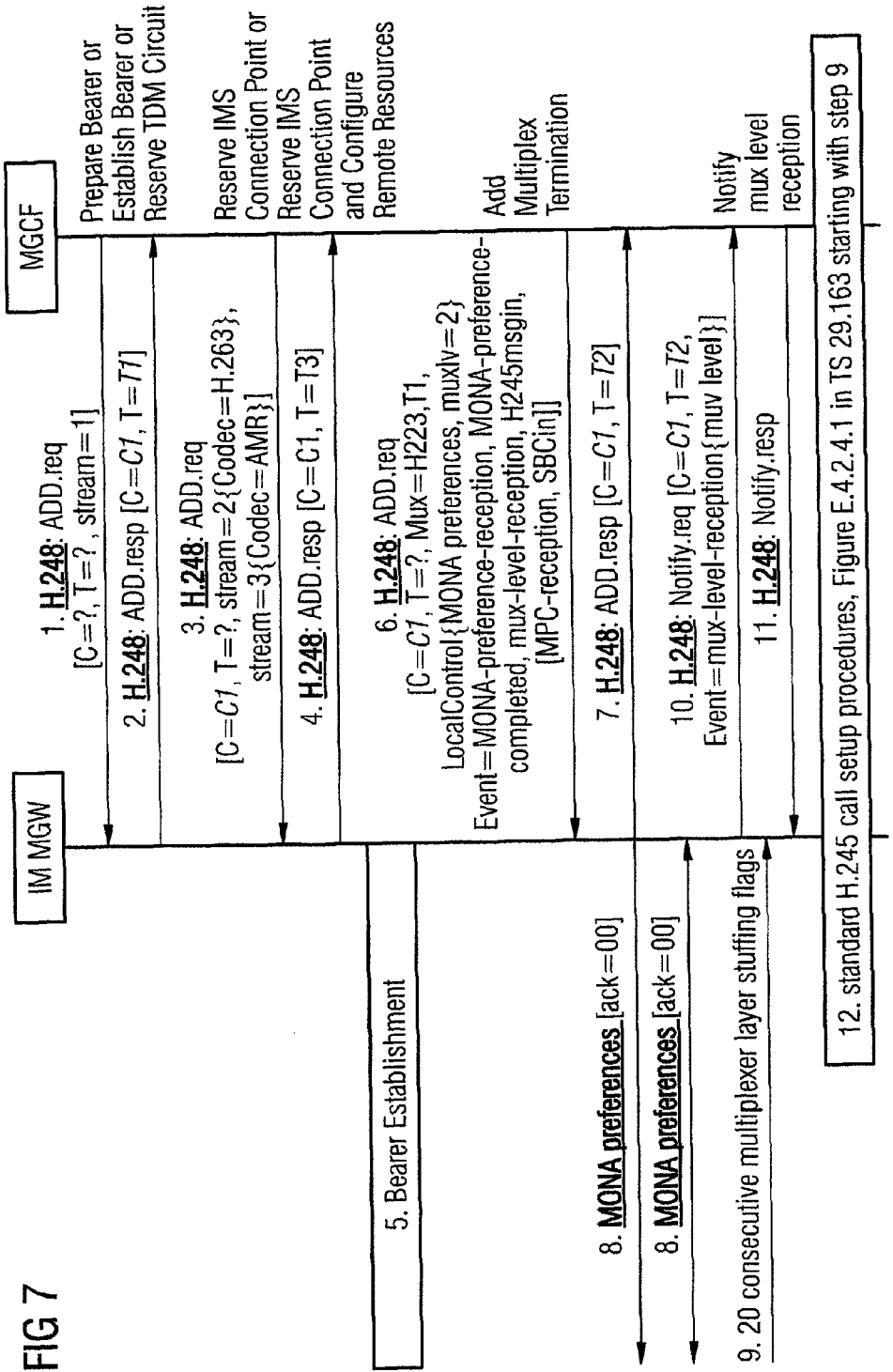

FIG. 6 shows signalling interactions at the Mn interface for receiving MONA signalling preconfigured channels involving a gateway controlling device (MGCF) and a media gateway device (IM MGW) and thus also illustrates respective configurations of these devices; and FIG. 7 shows signalling interactions at the Mn interface for fallback from MONA procedures to standard H.324 setup involving a gateway controlling device (MGCF) and a media gateway device (IM MGW) and thus also illustrates respective configurations of these devices.

In the following, preferred embodiments of the present invention are described with reference to the accompanying drawings. It should, however, be understood that this description is for illustrative purposes only and that the present invention is by no means to be construed as being limited to the embodiments described and illustrated.

According to preferred embodiments of the present invention, one or more of the following is implemented.

A controlling entity (e.g. MGCF) sends a message to a controlled entity (e.g. IM-MGW) requesting that the MONA preferences negotiation is started, and provides the MONA preferences to be advertised by the controlled entity within that message.

Upon reception of this message, the controlled entity starts sending MONA preference messages. The controlled entity repeats sending those messages and increments the acknowledgment bits of sent MONA preference messages when receiving incoming MONA preference messages according to MONA procedures.

The controlled entity notifies the controlling entity when receiving the first incoming MONA preference message and forwards the received information. The controlled entity does not notify the controlling entity about subsequent incoming MONA preference message.

To use MONA MPC related procedures, the controlling entity may also send a message to the controlled entity requesting to be notified about the channel type of received MPC packet data units. If the controlled entity then receives the first MPC PDU of a given predefined channel type (see e.g. FIG. 3, signal 6), and the controlling entity has requested a notification about such an event, the controlled entity notifies the controlled entity about the received channel type.

To use MONA MPC related procedures, the controlling entity may also send a message to the controlled entity requesting to send media encoded according to one or several of the media predefined channel types defined by MONA.

Upon reception of this request, if the controlled entity receives any media streams that require interworking towards the corresponding H.324 session, the controlled entity sends these media in MPC packet data units of the requested predefined channel type attached to MONA preference messages, and transcodes the media if required.

To use MONA SPC related procedures, the controlling entity may also send a message to the controlled entity requesting to be notified about the reception of SPC packet data units. If the controlled entity then receives the first SPC PDU, and the controlling entity has requested a notification about such an event, the controlled entity forwards the SPC PDU to the controlled entity. The controlled entity compares any subsequent received SPC packet data units with the previous received SPC PDU and forwards the subsequently received SPC PDU to the controlled entity only if it differs from the previous received SPC PDU.

To use MONA SPC related procedures, the controlling entity may also send a message to the controlled entity providing an SPC PDU and requesting that this PDU is forwarded. Upon reception of this request, the controlled entity sends the SPC PDU. The controlled entity should repeat sending this SPC PDU without further request from the controlling entity.

Thus, according to a design of procedures at the Mn interface to support MONA as described in connection with the above embodiments, the following advantages can be achieved.

The H.245 handling can be performed in the MGCF to keep procedures aligned as far as possible with standard Mn procedures to support H.324 interworking.

The MGCF can also control MONA preference message exchange procedures in order to maintain the agreed architectural work split between MGCF and IM-MGW in analogy to the H.245 handling.

In a preferred implementation, the IM-MGW understands the MONA preference messages at least to a sufficient degree to de-encapsulate the possibly attached MPC and SPC packet data units.

Furthermore, the frequent retransmissions of MONA preference messages required by MONA procedures are performed by the IM-MGW autonomously to avoid unnecessary load at the Mn interface and the MGCF.

Figure 1:
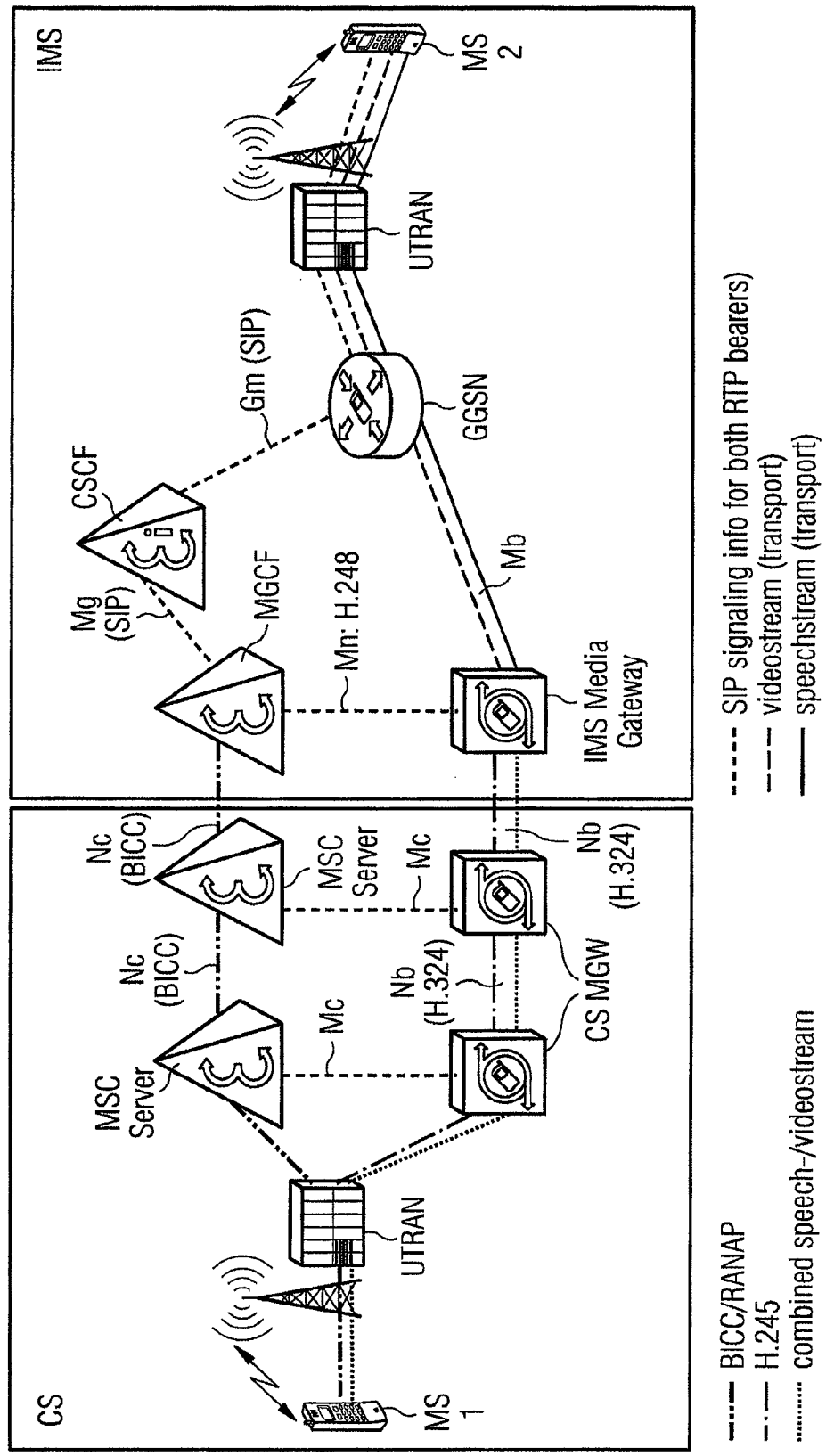
FIG. 1 shows a typical network configuration to which the present invention is applicable.
Figure 2:
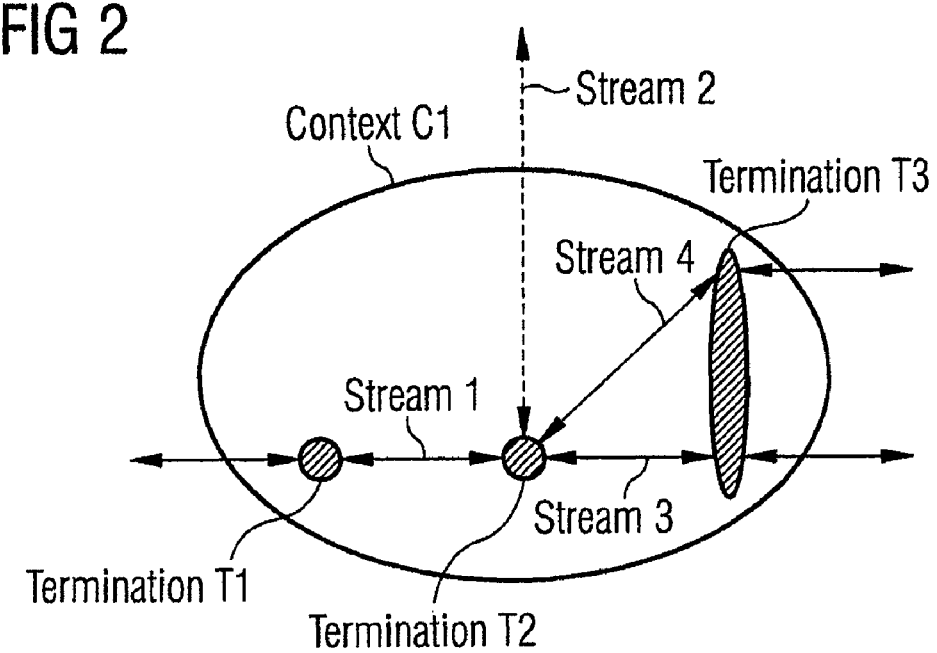
FIG. 2 shows an H.248 context model according to specification 3GPP TS 29.163 which underlies preferred embodiments of the present invention.

In the following, the preferred embodiments of the present invention are described in even more detail, wherein the H.248 context model according to specification 3GPP TS 29.163 as shown in FIG. 2 underlies signalling flows described below.

Figure 3B:
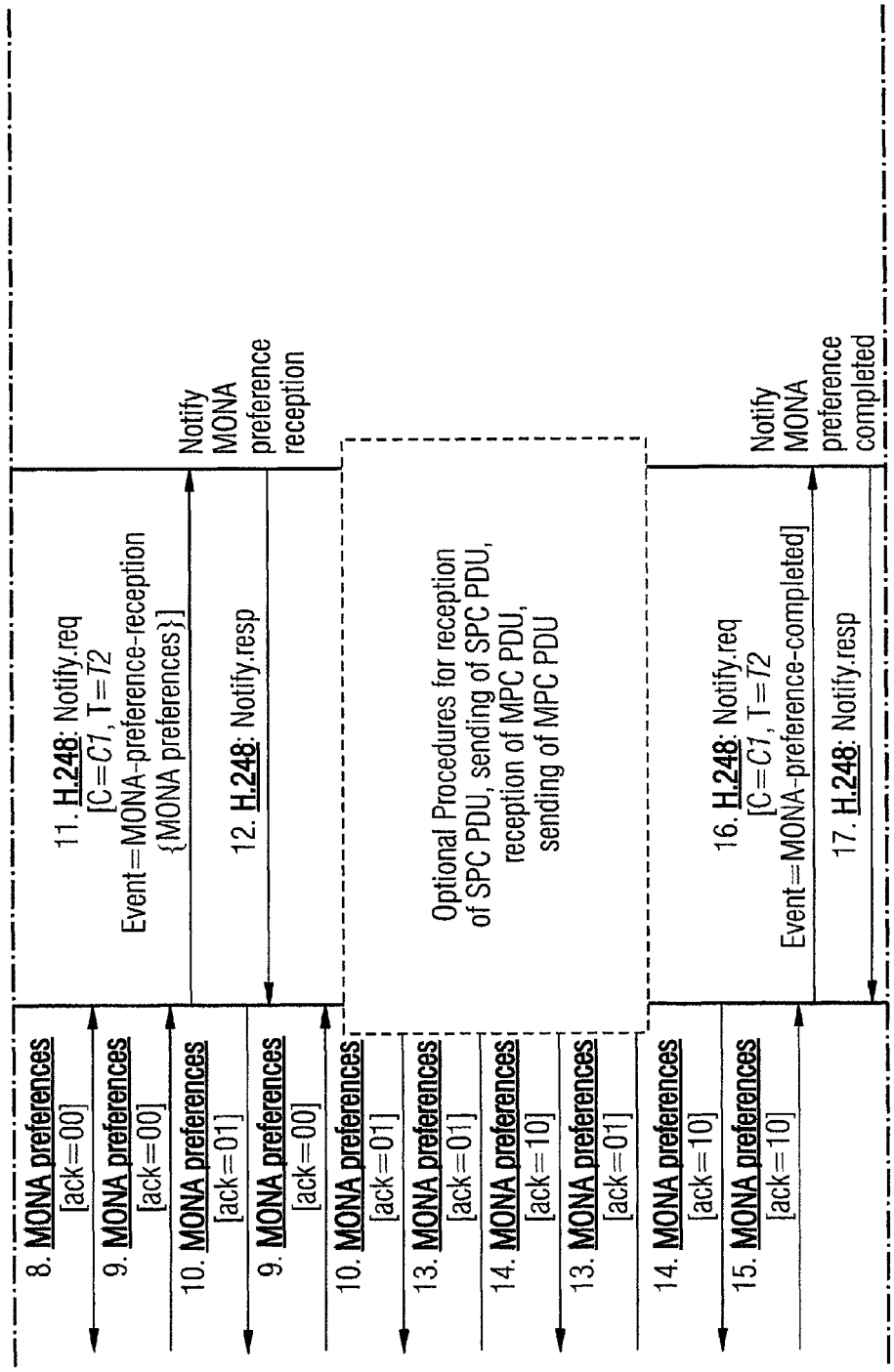
FIG. 3 shows signalling interactions at the Mn interface for MONA preference messages involving a gateway controlling device (MGCF) and a media gateway device (IM MGW) and thus also illustrates respective configurations of these devices.
Figure 3C:
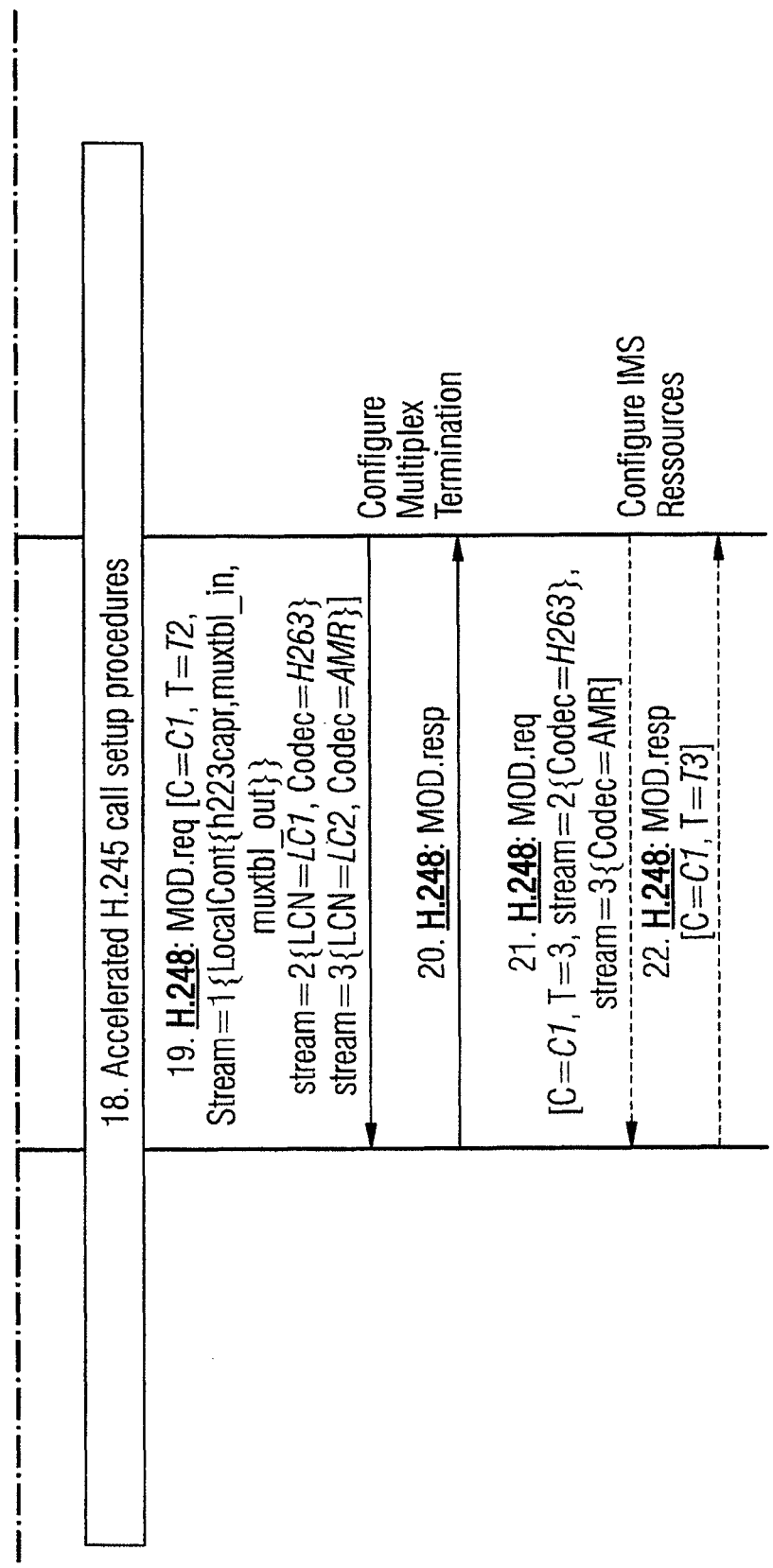

FIG. 3 shows the signalling flows for interactions at the Mn interface for MONA preference messages. It is to be noted that the MONA preference messages are repeated several times, wherein one repetition is illustrated for each such message with the same number as the first message.

According to the preferred embodiments shown in FIG. 3, the MGCF requests terminations towards the CS network (signals 1 and 2) and towards the IMS (signals 3 and 4). For the terminations towards the IMS, the MGCF provides an estimate about the applicable codecs in the required information elements "Local IMS Resources" (for both "Reserve IMS Connection Point" procedure and "Reserve IMS Connection Point and Configure Remote Resources" procedure) and possibly "Remote IMS Resources" (only for "Reserve IMS Connection Point and Configure Remote Resources" procedure).

The MGCF requests that the H.223 stream is (de-) multiplexed at the MUX termination T2 (signal 6). Furthermore, the MGCF requests that MONA preferences negotiation is started, and provides that the MONA preferences are to be indicated by the IM-MGW. The MGCF encodes the MONA preferences as described in clause 6 of specification ITU-T H.324 Amendment 1. The MGCF takes the H.324 related capabilities of the IM-MGW into account in the MONA preferences. These capabilities can be known by the MGCF by configuration. The MGCF also requests to be notified about the reception of the remote MONA preferences and about the completion of the MONA preference exchange, and about the possible reception of a H.323 multiplex level message or a H.245 message on the H.323 control channel. The MGCF also provides a multiplexing level which will be advertised by the IM-MGW for fallback to standard H.324 setup procedures. If the MGCF indicates the capability to receive SPC packet data units within the MONA preferences, it also requests to be notified about incoming SPC packet data units (which is described further below). If the MGCF indicates the capability to receive any MPC packet data units within the MONA preferences, it also requests to be notified about incoming MPC packet data units, as detailed below.

The IM-MGW starts sending MONA preference messages after receipt of the corresponding request from the MGCF and CS bearer establishment (signal 8). The IM-MGW repeats sending those messages and increments the acknowledgment bits of sent MONA preference messages when receiving incoming MONA preference messages according to MONA procedures (signals 8, 10, 14).

After sending at least ten MONA preference messages, while the IM-MGW continues to send and receive MONA preference messages, it attaches MPC or SPC packet data units if requested to do so by the MGCF, as described further below. If the IM-MGW receives preference messages with an attachment, it inspects the first octet of that attachment that will contain a MUX code according to table K.15 of specification ITU-T H.324 Amendment 1 that identifies the attached PDU as either a MPC PDU of one of the predefined channels or a SPC PDU. The IM-MGW handles the attached MPC or SPC packet data units as described below.

After sending at least ten MONA preference messages, the IM-MGW inserts stuffing flags indicating the multiplexing level received from the MGCF between MONA preference messages as described in clause K.7.1.1 of specification ITU-T H.324 Amendment 1.

The IM-MGW notifies the MGCF, when receiving the first incoming MONA preference message (signals 11 and 12), and forwards the received information. Subsequent incoming MONA preference message will be identical apart from possible increments in the acknowledgement bits. The IM-MGW does not notify the MGCF about these messages. Upon reception of the notification of a MONA preference message, the MGCF compares the received MONA preferences message with the preferences message it sent, and reacts as described in clause 7.1 of specification ITU-T H.324 Amendment 1.

When receiving an incoming MONA preference message with acknowledgment bits 10, the IM-MGW stops sending MONA preference messages and notifies the MGCF about the completion of the MONA preference exchange procedure (signals 16 and 17).

Upon reception of this notification, the MGCF checks if all desired media channels have been established. Otherwise the MGCF uses accelerated H.245 procedures as defined by MONA to set up media channels. Corresponding H.245 messages are transported transparently between the IM-MGW and the MGCF using the "Signal H.245 message" and "Notify H.245 message" procedures defined in specification 3GPP TS 29.163.

After receiving the notification about the completion of the MONA preference exchange procedure, and a completion of the possible subsequent accelerated H.245 setup procedures, the MGCF configures the multiplexing termination T2 by indicating to the IM-MGW the contents of the incoming and outgoing multiplex tables (signal 19), and modifies the selected codecs at the IMS side (signal 21).

Herein below, reference is made to FIG. 4, which shows the signalling interactions at the Mn interface for MONA media preconfigured channels as referred to above as a modification to the preferred embodiments of the present invention.

It is to be noted that MONA preference messages are repeated several times, However, only one repetition is shown for each such message with the same signal number as the first message.

Specifically, FIG. 4 illustrates that if the MGCF indicates the ability to receive any predefined MPC channel types in the MONA preferences messages, the MGCF requests the IM-MGW to report the channel type of received MPC packet data units (signal 1).

If the MGCF intends to use media preconfigured channels for sending media during the MONA setup, the MGCF requests the IM-MGW to send media encoded according to one or several of the media predefined channel types defined by MONA (signal 3), while the MONA preference exchange described above is ongoing. The MGCF selects channel types for codecs which are supported by both the IMS side and the IM-MGW, and/or for codecs which could be transcoded by the IM-MGW from the codecs supported by the IMS side. The MGCF may also configure the MGW to receive these channels at the same time.

Upon reception of this request, the IM-MGW forwards any media received from the IMS side in MPC packet data units of the corresponding predefined channel type attached to MONA preference messages, and transcodes the media if required (signal 5).

If the IM-MGW receives the first MONA preference message with attached MPC PDU of a given predefined channel type (signal 6), and the MGCF has requested a notification about such an event, the IM-MGW notifies the MGCF about the received channel type (signal 7). The IM-MGW does not notify the MGCF about subsequent receptions of MPC packet data units of the same channel type.

Upon reception of such a notification, if the IM-MGW supports the indicated channel type and has not yet been configured to receive media of that channel type, and if the MGCF has previously indicated the capability to receive media preconfigured channels of that channel type within MONA preference messages, the MGCF configures the IM-MGW to receive media of that channel type and forwards them to the IMS side (signal 9).

Herein below, reference is made to FIG. 5, which shows the signalling interactions at the Mn interface for sending MONA signalling preconfigured channels as referred to above as a further modification to the preferred embodiments of the present invention.

It is to be noted that the MONA preference messages are repeated several times. However, only one repetition is shown for each such message with the same signal number as the first message.

Specifically, FIG. 5 illustrates that H.245 packet data units for SPC are transported between the IM-MGW and MGCF over the Mn interface using H.248 events (from the IM-MGW towards the MGCF) and H.248 signals (from the MGCF towards the IM-MGW). The events/signals contain the H.245 message in binary format as parameters.

The related procedures are distinct from the procedures in clause E.4.2.3 of specification 3GPP TS 29.163, since the packet data units are received or sent by the IM-MGW using the SPC, i.e. as attachment to MONA preference messages.

If the MGCF supports signalling preconfigured channels, it complies to the SPC procedures in Clause K.8 of specification ITU-T H.324 Amendment 1. However, the MGCF does not repeat sending the same signalling preconfigured channels, as this repetition will be handled by the IM-MGW.

Within the sent SPC packet data units, the MGCF includes the codecs which are supported by both the IMS side and the IM-MGW, and the codecs which could be transcoded by the IM-MGW from the codecs supported by the IMS side.

In signal 1, the MGCF requests the IM-MGW to send an H.245 message to the CS side. To request the IM-MGW to send a H.245 message to the CS side, the MGCF sends an H.248 signal to the IM-MGW with the complete H.245 message content.

Upon reception of this signal, the IM-MGW sends the encapsulated H.245 message within the H.248 signal as attachment to a MONA preference message as described in Clause K.9.4 of specification ITU-T H.324 Amendment 1 (signal 3). It repeats sending this H.245 message as attachment to subsequent MONA preference messages.

Herein below, reference is made to FIG. 6, which shows the signalling interactions at the Mn interface for receiving MONA signalling preconfigured channels as referred to above as a further modification to the preferred embodiments of the present invention.

It is to be noted that MONA preference messages are repeated several times. However, only one repetition is shown for each such message with the same signal number as the first message.

Specifically, FIG. 6 illustrates with signal 1, that the MGCF requests the IM-MGW to detect a received H.245 message from the CS side in SPC packet data units attached to MONA preference messages and forwards them to the MGCF. To request the IM-MGW to detect and forward these H.245 message, the MGCF sends a suitable H.248 event to the IM-MGW. The event may be indicated through an H.248 ADD command.

In signal 3, the IM-MGW receives an H.245 message from the CS side attached as SPC PDU to a MONA preference message. Upon reception of such an H.245 message from the CS side, the IM-MGW checks if it has already forwarded the same H.245 message to the MGCF, and otherwise forwards the H.245 message to the MGCF within an H.248 Notify command (signal 4). The IM-MGW does not forward the same H.245 message which is received again in subsequent MONA preference messages.

If the IM-MGW does not support forwarding SPC packet data units or has not been requested by the MGCF to forward these packet data units, it discards received SPC packet data units.

Herein below, reference is made to FIG. 7, which shows the signalling interactions at the Mn interface for fall back from MONA procedures to standard H.324 setup as referred to above as a further modification to the preferred embodiments of the present invention.

It is to be noted that MONA preference messages are repeated several times. However, only one repetition is shown for each such message with the same signal number as the first message.

Specifically, FIG. 7 illustrates that when the MGCF requests that the MONA preferences negotiation is started, the MGCF also requests to be notified about the possible reception of H.323 multiplex level stuffing flags or a H.245 message on the H.323 control channel. The MGCF also provides a multiplexing level which will be advertised by the IM-MGW for fallback to standard H.324 setup procedures (signal 6).

If the IM-MGW receives more than 20 valid consecutive multiplexer level stuffing flags (signal 9), it notifies the MGCF (signal 10) and stops sending MONA preference messages. The IM-MGW engages in normal H.324 multiplexing level negotiations.

The MGCF then stops MONA procedures and falls back to standard H.245 call set-up procedures, as depicted in Figure E.4.2.4.1 in specification 3GPP TS 29.163 starting with step 9.

If the IM-MGW receives a normal H.245 message (not shown), it also forwards this message to the MGCF. If the MGCF receives such a H.245 message during the MONA call setup, and this H.245 message is a normal Terminal Capability Set message, the MGCF also stops MONA procedures and falls back to standard H.245 call set-up procedures, as depicted in Figure E.4.2.4.1 in specification 3GPP TS 29.163 starting with step 9.

An implementation of embodiments of the present invention may be achieved by providing a computer program product embodied as a computer readable medium which stores instructions according to the above described embodiments.

Thus, what is described above is a gateway controlling device is configured to send a message to a controlled device requesting that a media oriented negotiation acceleration preference message is to be sent repeatedly. The gateway controlling device is further configured to provide the controlled device with media oriented negotiation acceleration preferences within that message which are to be advertised by the controlled device, and to request the controlled device to send a notification to the gateway controlling device about receipt of the first media oriented negotiation acceleration preference message. The gateway controlling device receives a notification from the controlled device about receipt of a media oriented negotiation acceleration preference message which firstly came in at the controlled device.

What has been described above is what is presently considered to be preferred embodiments of the present invention. However, as is apparent to the skilled reader, these are provided for illustrative purposes only and are in no way intended to that the present invention is restricted thereto. Rather, it is the intention that all variations and modifications be included which fall within the spirit and scope of the appended claims.

The invention claimed is:

1. A media gateway device, comprising:
   a receiver configured to receive a message from a gateway controlling device, the message comprising a request that a media oriented negotiation acceleration preferences negotiation with remote terminals is to be started as well as media oriented negotiation acceleration preferences to be advertised to the remote terminals;
   a transmitter configured to repeatedly send media oriented negotiation acceleration preference messages to the remote terminals according to the request;
   a processor configured to increment acknowledgment bits of sent media oriented negotiation acceleration preference messages when receiving incoming media oriented negotiation acceleration preference messages from the remote terminals;
   a notifier configured to notify the gateway controlling device when receiving the first incoming media oriented negotiation acceleration preference message from a remote terminal, and to not notify the gateway controlling device about a subsequently incoming media oriented negotiation acceleration preference message; and
   a forwarder configured to forward the received information.

2. The media gateway device according to claim 1, further comprising an internet multimedia subsystem media gateway functionality.

3. The media gateway device according to claim 1, further comprising
   a receiver configured to receive a first media preconfigured channel packet data unit of a given predefined channel type; and
   a notifier configured to notify the gateway controlling device about the received channel type.

4. The media gateway device according to claim 1, further comprising
   a receiver configured to receive media streams that require interworking towards a corresponding H.324 session; and
   a transmitter configured to send these media streams in media preconfigured channel packet data units of a predefined channel type requested by the gateway controlling device by media oriented negotiation acceleration preference messages, transcoding the media if required.

5. The media gateway device according to claim 1, further comprising
   a receiver configured to receive a first signalling preconfigured channel packet data unit; and
   a forwarder configured to forward the signalling preconfigured channel packet data unit to the gateway controlling device.

6. The media gateway device according to claim 1, further comprising
   a receiver configured to receive a message from the gateway controlling device providing a signalling preconfigured channel packet data unit; and
   a forwarder configured to repeatedly forward this signalling preconfigured channel packet data unit.

7. The media gateway device according to claim 1, further comprising
   a notifier configured to notify the gateway controlling device about the receipt of more than a preconfigured number of valid consecutive multiplex level stuffing flags.

8. A media gateway device, comprising:
   a receiver configured to receive a message from a gateway controlling device, the message comprising a request that a media oriented negotiation acceleration preferences negotiation with remote terminals is to be started as well as media oriented negotiation acceleration preferences to be advertised to the remote terminals;
   a transmitter configured to repeatedly send media oriented negotiation acceleration preference messages to the remote terminals according to the request;
   a processor configured to increment acknowledgment bits of sent media oriented negotiation acceleration preference messages when receiving incoming media oriented negotiation acceleration preference messages from the remote terminals;
   a comparator configured to compare any subsequently received signalling preconfigured channel packet data units with the previously received signalling preconfigured channel packet data unit; and
   a forwarder configured to forward the subsequently received signalling preconfigured channel packet data unit to the gateway controller only, if it differs from the previously received signalling preconfigured channel packet data unit.

9. The media gateway device according to claim 8, further comprising an internet multimedia subsystem media gateway functionality.

10. The media gateway device according to claim 8, further comprising
    a receiver configured to receive a first media preconfigured channel packet data unit of a given predefined channel type; and
    a notifier configured to notify the gateway controlling device about the received channel type.

11. The media gateway device according to claim 8, further comprising
    a receiver configured to receive media streams that require interworking towards a corresponding H.324 session; and
    a transmitter configured to send these media streams in media preconfigured channel packet data units of a predefined channel type requested by the gateway controlling device by media oriented negotiation acceleration preference messages, transcoding the media if required.

12. The media gateway device according to claim 8, further comprising
    a receiver configured to receive a first signalling preconfigured channel packet data unit; and
    a forwarder configured to forward the signalling preconfigured channel packet data unit to the gateway controlling device.

13. The media gateway device according to claim 8, further comprising
 a receiver configured to receive a message from the gateway controlling device providing a signalling preconfigured channel packet data unit; and
 a forwarder configured to repeatedly forward this signalling preconfigured channel packet data unit.

14. The media gateway device according to claim 8, further comprising
 a notifier configured to notify the gateway controlling device about the receipt of more than a preconfigured number of valid consecutive multiplex level stuffing flags.

15. A media gateway method, comprising
 receiving a message from a gateway controlling device by a media gateway device, the message comprising a request that a media oriented negotiation acceleration preferences negotiation is to be started as well as media oriented negotiation acceleration preferences to be advertised to remote terminals;
 repeatedly sending media oriented negotiation acceleration preference messages by the media gateway device to the remote terminals according to the request;
 incrementing acknowledgment bits of sent media oriented negotiation acceleration preference messages by the media gateway device when receiving incoming media oriented negotiation acceleration preference messages from the remote terminals;
 notifying the gateway controlling device by the media gateway device when receiving the first incoming media oriented negotiation acceleration preference message from a remote terminal and not notifying the gateway controlling device about a subsequent incoming media oriented negotiation acceleration preference message; and
 forwarding the received information by the media gateway device.

16. The media gateway method according to claim 15, further comprising
 using an internet multimedia subsystem media gateway functionality by the media gateway device.

17. The media gateway method according to claim 15, further comprising
 receiving a first media preconfigured channel packet data unit of a given predefined channel type by the media gateway device; and
 notifying the gateway controlling device by the media gateway device about the received channel type.

18. The media gateway method according to claim 15, further comprising
 receiving media streams by the media gateway device that require interworking towards a corresponding H.324 session; and
 sending these media streams by the media gateway device in media preconfigured channel packet data units of a predefined channel type requested by the gateway controlling device by media oriented negotiation acceleration preference messages, and transcoding the media by the media gateway device if required.

19. The media gateway method according to claim 15, further comprising
 receiving a first signalling preconfigured channel packet data unit by the media gateway device; and
 forwarding the signalling preconfigured channel packet data unit by the media gateway device to the controller.

20. The media gateway method according to claim 15, further comprising
 receiving a message by the media gateway device from the gateway controlling device providing a signalling preconfigured channel packet data unit; and
 repeatedly forwarding this signalling preconfigured channel packet data unit by the media gateway device.

21. The media gateway method according to claim 15, further comprising
 notifying the gateway controlling device about the receipt of more than a preconfigured number of valid consecutive multiplex level stuffing flags.

22. A media gateway method, comprising
 receiving a message from a gateway controlling device by a media gateway device, the message comprising a request that a media oriented negotiation acceleration preferences negotiation is to be started as well as media oriented negotiation acceleration preferences to be advertised to remote terminals;
 repeatedly sending media oriented negotiation acceleration preference messages by the media gateway device to the remote terminals according to the request;
 incrementing acknowledgment bits of sent media oriented negotiation acceleration preference messages by the media gateway device when receiving incoming media oriented negotiation acceleration preference messages from the remote terminals;
 comparing by the media gateway device any subsequently received signalling preconfigured channel packet data units with the previously received signalling preconfigured channel packet data unit; and
 forwarding the subsequently received signalling preconfigured channel packet data unit by the media gateway device to the gateway controlling device only, if it differs from the previously received signalling preconfigured channel packet data unit.

23. The media gateway method according to claim 22, further comprising
 using an internet multimedia subsystem media gateway functionality by the media gateway device.

24. The media gateway method according to claim 22, further comprising
 receiving a first media preconfigured channel packet data unit of a given predefined channel type by the media gateway device; and
 notifying the gateway controlling device by the media gateway device about the received channel type.

25. The media gateway method according to claim 22, further comprising
 receiving media streams by the media gateway device that require interworking towards a corresponding H.324 session; and
 sending these media streams by the media gateway device in media preconfigured channel packet data units of a predefined channel type requested by the gateway controlling device by media oriented negotiation acceleration preference messages, and transcoding the media by the media gateway device if required.

26. The media gateway method according to claim 22, further comprising
 receiving a first signalling preconfigured channel packet data unit by the media gateway device; and
 forwarding the signalling preconfigured channel packet data unit by the media gateway device to the controller.

27. The media gateway method according to claim 22, further comprising
 receiving a message by the media gateway device from the gateway controlling device providing a signalling preconfigured channel packet data unit; and repeatedly forwarding this signalling preconfigured channel packet data unit by the media gateway device.

28. The media gateway method according to claim 22, further comprising
notifying the gateway controlling device about the receipt of more than a preconfigured number of valid consecutive multiplex level stuffing flags.

29. A non-transitory computer-readable storage medium having computer executable components encoded with instructions that, when executed on a computer, perform:
receiving a message from a gateway controlling device by a media gateway device, the message comprising a request that a media oriented negotiation acceleration preferences negotiation is to be started as well as media oriented negotiation acceleration preferences to be advertised to remote terminals;
repeatedly sending media oriented negotiation acceleration preference messages by the media gateway device to the remote terminals according to the request;
incrementing acknowledgment bits of sent media oriented negotiation acceleration preference messages by the media gateway device when receiving incoming media oriented negotiation acceleration preference messages from the remote terminals;
notifying the gateway controlling device by the media gateway device when receiving the first incoming media oriented negotiation acceleration preference message from a remote terminal and not notifying the gateway controlling device about a subsequent incoming media oriented negotiation acceleration preference message; and
forwarding the received information by the media gateway device.

30. A non-transitory computer-readable storage medium having computer executable components encoded with instructions that, when executed on a computer, perform:
receiving a message from a gateway controlling device by a media gateway device, the message comprising a request that a media oriented negotiation acceleration preferences negotiation is to be started as well as media oriented negotiation acceleration preferences to be advertised to remote terminals;
repeatedly sending media oriented negotiation acceleration preference messages by the media gateway device to the remote terminals according to the request;
incrementing acknowledgment bits of sent media oriented negotiation acceleration preference messages by the media gateway device when receiving incoming media oriented negotiation acceleration preference messages from the remote terminals;
comparing by the media gateway device any subsequently received signalling preconfigured channel packet data units with the previously received signalling preconfigured channel packet data unit; and
forwarding the subsequently received signalling preconfigured channel packet data unit by the media gateway device to the gateway controlling device only, if it differs from the previously received signalling preconfigured channel packet data unit.

* * * * *